United States Patent [19]

Laugesen

[11] 4,390,830
[45] Jun. 28, 1983

[54] BACK CORONA DETECTION AND CURRENT SETBACK FOR ELECTROSTATIC PRECIPITATORS

[75] Inventor: Thomas C. Laugesen, Silverton, N.J.

[73] Assignee: NWL Transformers, Bordentown, N.J.

[21] Appl. No.: 311,870

[22] Filed: Oct. 15, 1981

[51] Int. Cl.³ .......................................... G05F 1/455
[52] U.S. Cl. ................................... 323/237; 55/105; 323/241
[58] Field of Search ................. 55/105; 323/237, 275, 323/241, 903

[56] References Cited

U.S. PATENT DOCUMENTS

| | | | |
|---|---|---|---|
| 2,907,403 | 10/1959 | Foley | 323/903 X |
| 2,961,577 | 11/1960 | Thomas et al. | |
| 3,039,252 | 6/1962 | Guldemond et al. | 323/903 X |
| 3,648,437 | 3/1972 | Bridges | |
| 3,745,749 | 7/1973 | Gelfand | |
| 3,772,853 | 11/1973 | Burge et al. | |
| 3,873,282 | 3/1975 | Finch | |
| 4,138,232 | 2/1979 | Winkler et al. | |
| 4,152,124 | 5/1979 | Davis | |
| 4,326,245 | 4/1982 | Saleh | 323/275 X |
| 4,326,860 | 4/1982 | Laugesen | 323/903 X |

Primary Examiner—William M. Shoop
Attorney, Agent, or Firm—Ratner & Prestia

[57] ABSTRACT

A back corona detector that reduces current flow to the plates of an electrostatic precipitator when a corona occurs between a plate and the dust layer that forms on the plate thereby minimizing the corona condition. The ramping voltage in a transformer/rectifier set under usual operating conditions will vary proportionally with current flow. At the onset of a back corona condition, a comparator senses a sudden increase in current with respect to the voltage indicating that the current is being consumed to maintain the corona rather than providing for particulate precipitation. A current setback circuit is then pulsed periodically so that the current is continuously reduced until the voltage/current relationship is maintained at the knee of the voltage/current curve.

6 Claims, 3 Drawing Figures

BACK CORONA DETECTION AND CURRENT SETBACK FOR ELECTROSTATIC PRECIPITATORS

BACKGROUND OF THE INVENTION

A. Field of the Invention

The present invention relates to a detector for detecting a back corona condition in an electrostatic precipitator and setting back the current.

B. Background Art

It is known in the art to detect voltage breakdowns on the high voltage side of electrostatic precipitators. In such precipitators, the d.c. voltage applied directly to the electrodes is slowly and gradually increased or ramped up to but not exceeding a voltage level at which a breakdown in the precipitator gap occurs. However, voltage breakdown may occur when a voltage, arising from another portion of the precipitator circuit, is providing a current of large magnitude to the precipitator. This additional applied voltage must be quickly detected and reduced to prevent loss of precipitator efficiency. In essence, voltage breakdown is detected and voltages that create large current flows through the plates of the precipitator are reduced in value.

A similar problem occurs when a layer of dust builds up on the electrodes of the precipitator such that a back corona condition occurs in which the current being supplied to the precipitator plates becomes consumed in the back corona instead of being used to precipitate the suspended gas particles. More current will then be fed to the precipitator, but the increase in current will be used to sustain the back corona rather than for providing particle precipitation. Therefore, a detector has been needed that would sense the point at which current no longer increased in direct proportion to the voltage thereby terminating efficient particulate precipitation. An object of the invention is to reduce current until a point has been reached where the current no longer increases faster than the voltage such that the precipitator would be operated at this point. By reducing the current sufficiently, the back corona condition would be minimized so that more of the current flowing to the precipitator would be used for precipitating particulate matter rather than to feed the back corona condition.

SUMMARY OF THE INVENTION

A control system for monitoring across an electrostatic precipitator, the departure of current from voltage at the start of a back corona condition. The control system continuously reduces the current until the back corona condition is minimized. Comparing means is provided for comparing the voltage and current applied to the precipitator for detecting when the current increases at a faster rate than the voltage for producing a signal indicating the back corona condition. The current is set back in response to the back corona condition signal for substantially minimizing the current while maximizing the voltage to maintain normal precipitator operation at the knee of the voltage/current curve.

DESCRIPTION OF THE PREFERRED EMBODIMENT

Figure 1:
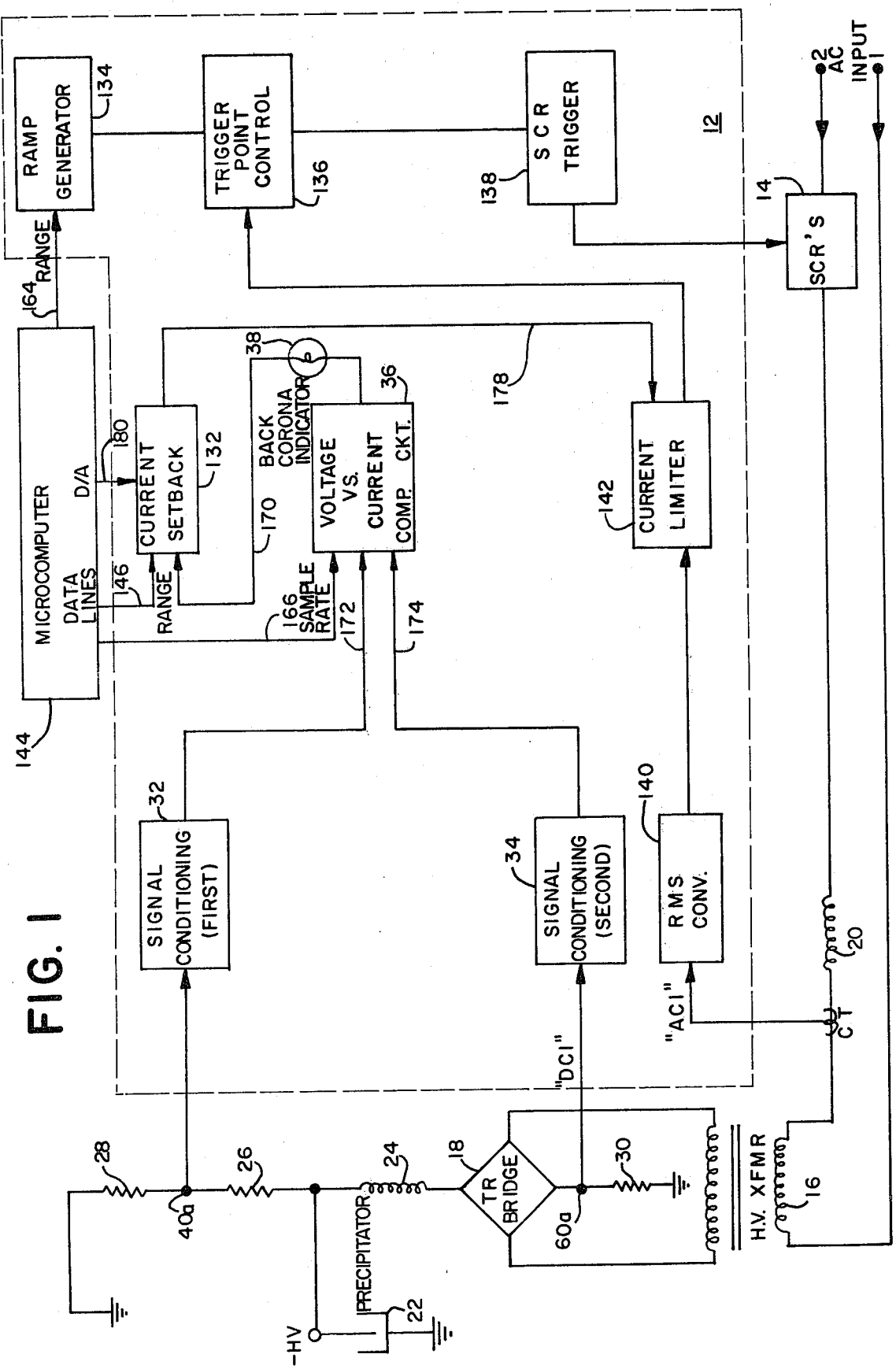
FIG. 1 is a block diagram of a system for back corona detection and current setback for an electrostatic precipitator embodying the present invention.

Referring to the block diagram of FIG. 1, which includes a preferred embodiment of a portion of an electrostatic precipitator control system 10 connected to a transformer/rectifier (T/R) set 12, power is supplied to the T/R set input terminals 1 and 2 from an alternating current source. It is well known in the art that silicon controlled rectifiers 14 (SCR's) vary the primary winding potential of high voltage transformer 16, thus varying the high voltage AC appearing at the input of full-wave rectifier bridge 18. Current limiting reactor 20 protects both the silicon controlled rectifiers 14 and precipitator 22 from excessive current flow. Aircore inductor 24 further protects the rectifier bridge 18 by limiting high frequency capacitance discharge current surges generated during precipitator sparking. A voltage divider circuit consisting of resistors 26 and 28 (FIG. 1) provides a low voltage sample "KV Input" of the negative high voltage (approximately 50 KV) appearing on the ungrounded electrode of precipitator 22. A voltage analog of the precipitator current appears across resistor 30 as the DC current (DCI) signal.

Both the DCI voltage waveform and the KV Input signal are similar in that they both contain a DC component, ripple and, when present, a spark pulse. Because of the capacitive action of precipitator 22, the ripple component of the KV Input signal is normally much smaller than that of the DCI signal. However, when the conductivity of the particles being removed is high, the precipitator's capacitive action is reduced and the KV input ripple component increases.

The KV Input signal is conditioned by first signal conditioning circuit 32. The function of the first signal conditioning circuit 32 is to eliminate ripple and any spark pulses that occur as part of the KV Input signal and to remove the high frequency noise content of the KV Input signal. A similar second signal conditioning circuit 34 is used to condition the DC current signal and performs the same function as the first signal conditioning circuit 32 in the way that it eliminates ripple, spark pulses and high frequency noise in the DC Input signal. The two signal conditioning circuits will be specifically discussed in another part of this disclosure.

The conditioned DC current signal and the conditioned KV Input signal are both monitored by voltage vs. current comparator 36 which senses the point at which the DC current no longer increases proportionally with the KV Input (voltage). That is, the current will begin to increase more rapidly than the voltage thereby indicating the onset of a back corona condition in the precipitator. Voltage vs. current comparator circuit 36 detects or monitors the departure of the current signal from the voltage signal as the current increases more rapidly than the ramping voltage signal. The onset of the back corona condition will be visually observable as back corona indicator light 38 goes on. The indicator light will remain on during the time that the relationship between the current and voltage remain unbalanced.

The function of ramp generator 134 is to generate a slowly increasing voltage ramp whose slope may be manually varied. The output of ramp generator 134 is applied to trigger point control 136 which serves as a high input impedance amplifier and a drive source for SCR trigger 138. The output of SCR trigger 138 furnishes properly phased gating pulses to SCR's 14. The properly phased high level turn-on current from the SCR trigger 138 causes a phase back in the SCR's and immediately reduces current flow to the precipitator. The output of SCR trigger 138 follows the voltage ramp provided by ramp generator 134. SCR's 14 provide controlled voltage and protection for the precipitator by establishing an absolute maximum voltage which may appear across the primary of transformer 16.

Current transformer CT supplies a primary current signal to RMS converter 140 which converts the CT current signal to a DC signal proportional to the primary current. This DC signal is provided as input to current limiter 142 which protects the precipitator system against damage resulting from an overload. The limiter assures that current on the primary side of the high voltage transformer does not exceed a predetermined maximum set point value. It thus protects the system against failure such as short circuits in the precipitator 22, rectifier bridge 18 and transformer 16. Additionally, the current limiter 142 prevents precipitator current from reaching destructive levels. Accordingly, the primary current is sensed so that remedial action is taken by the trigger point control 136 and SCR trigger 138 so as to prevent the primary current from exceeding a predetermined maximum by limiting the conduction angle of SCR's 14. Specifically, if the primary current approaches the predetermined current limit, a current limiting signal will be applied so as to retard the firing of the silicon controlled rectifiers 14.

Microprocessor 144 provides set point values to current limiter 142, voltage vs. current comparator 36, current setback circuit 132 and ramp generator 134 by conventional programming.

Figure 2:
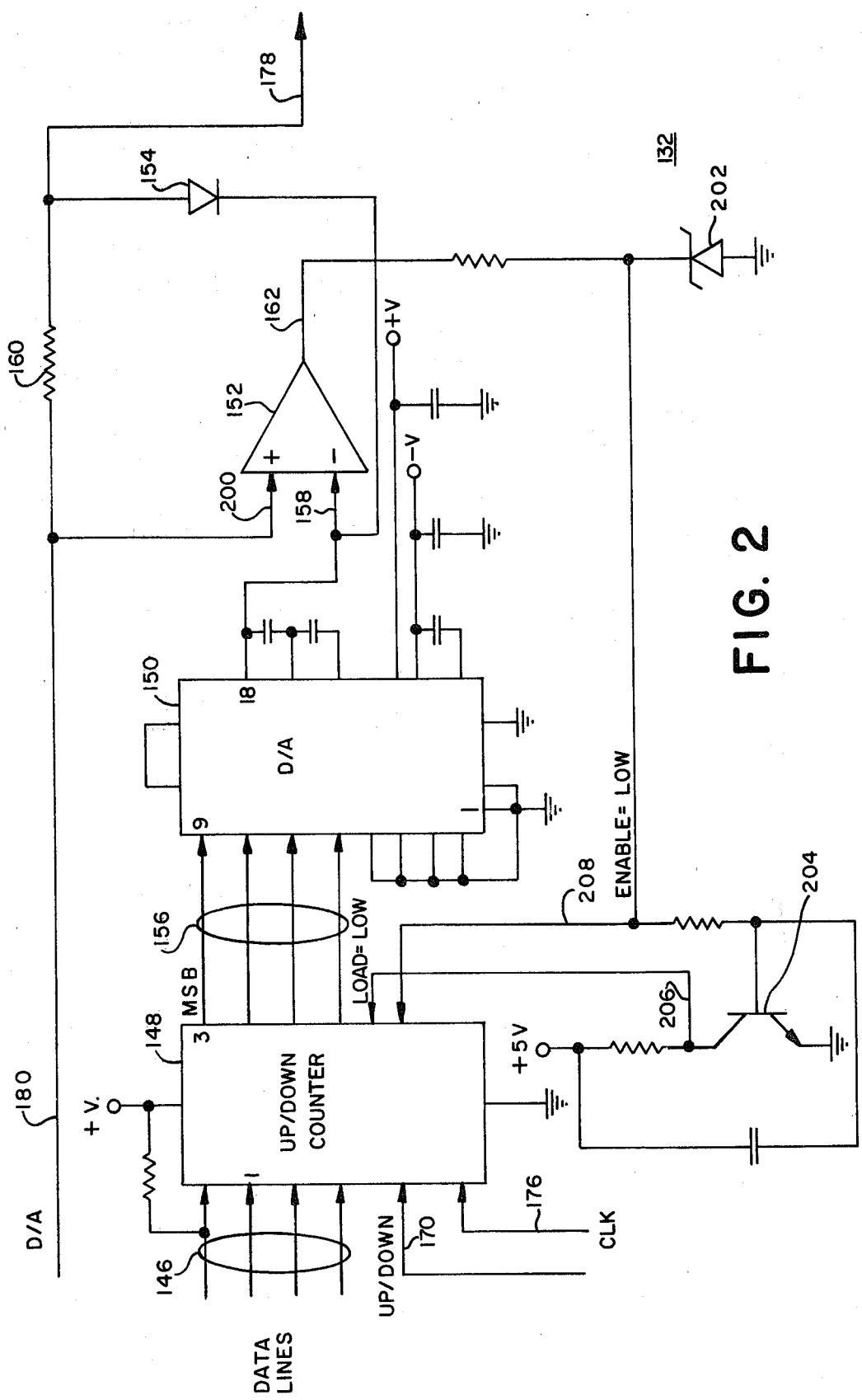
FIG. 2 is a more detailed block diagram of a current setback circuit in the system shown in FIG. 1.

As illustrated in FIG. 2, current set-back circuit 132 receives a digital value along data lines 146 that provides a range for up-down counter 148. Four-bit programmable up-down counter 148 is able to add to, as well as subtract from, the stored count. Counter 148 is preset to a given value using a standard 4-bit BCD or binary code at the preset inputs along data lines 146.

The 4-bit code is parallel loaded along lines 146 into counter 148. The state of the up/down input along line 170 determines whether the counter counts up (adds to the count) or down (subtracts from the count) on each positive edge clock transition provided along line 176. If the up/down input is at logic level 0, the counter adds; for a logic level 1, the counter subtracts.

To be able to continuously compare the count with the set point of current limiter 142 provided along line 180 and 178, a continuous analog signal must be obtained from the sequence of count values in digital form in counter 148. A digital-to-analog (D/A) converter 150 provides the continuous analog voltage by generating a signal alone line 158 proportional to the value of each digital word as it appears in sequence to the D/A converter along lies 156. D/A converter 150 also estimates the values to fill in the intervals between the digital counter values.

The most significant bit (MSB) contributes a voltage, equal to the D/A reference voltage, to the output of the converter when the MSB of the output of counter 148 is set at 1. When the MSB of said counter output is 0, the contribution of this bit to the output of the converter is nothing. A 1 in the next most significant bit contributes one half of the D/A reference voltage to the output of the converter and in like manner for the two remaining bits. These contributions correspond to the relative values of the bits in the binary output of counter 148. Therefore, the output of D/A converter 150 is proportional to the sum of the value of all bits in the output of the counter which have a value of 1 and, consequently, is proportional to the value represented by the digital word in counter 148 at any given time. It is well known in the art how to estimate the value of the analog signal at the output of converter 150 between the occurrence of digital data points from counter 148.

D/A converter output is provided, as a variable voltage level, to which the current limiter set-point voltage, provided along lines 189 and 178 via resistor 160, can be clamped.

Clamping diode 154 provides means to reduce the current limiter set-point voltage or reference voltage initially applied along lines 180 and 178 via resistor 160. The initial current limiter set-point may, therefore, be overridden with a "new" set-point value and become a variable reference current limiter set-point depending upon the output value of D/A converter 150 when the current set-back circuit 132 becomes activated. The "new" set-point value also limits the amount of current to be applied to the plates of the precipitator since the current would not be able to exceed the "new" set-point value. This new set-point value will be less than the initial set-point value provided to current limiter 142 before the corona discharge occurred.

Comparator 152 compares the two voltages between its two inputs. Therefore, the op-amp operates open-loop and is not phase/frequency compensated so as to allow for optimal response time. Since comparator 152 interfaces with counter 148, the standard op-amp output (±10 common mode input range) requires clamping in order to drive logic. Clamping occurs in the form of zener diode 202 which limits the output of op-amp 152 so as not to exceed the allowable voltage (5K maximum) applied to counter 148 along line 208.

The comparator provides an indication of the relative states of the two inputs on lines 200 and 158. The input on line 200 may be considered to be the reference potential and the other input on line 158 is the analog signal representative of the digital value for the count in counter 148. Comparator 152 will given an output along line 162 to indicate whether the analog count signal is below (or above) the reference potential. The reference signal or the setpoint value supplied to current limiter 142 along lines 180 and 178 is a positive voltage applied to the inverting input of op-amp 152 along line 200. The count signal is applied to the non-inverting input of op-amp 152 along line 158. When the count signal is lower than the reference signal, the output of op-amp 152 along line 162 will be at or near the negative saturation limit.

When the nominal voltage drop between the two compared voltage signals is sufficient in magnitude and sign, to provide a positive output of op-amp 152 to saturated switch 204, the initial preset value will be re-established for counter 148. This switch can deliver a zero to +5 volt logic output along line 206 for the purpose of resetting counter 148 to its preset input value by providing the preset enable input along line 208, at a low logic level, to counter 148.

Microprocessor 144 provides a voltage signal to ramp generator 134 along line 164 in order to control the time range within which ramping will occur. Also, microprocessor 144 transmits a sampling rate to voltage vs. current comparator 36 along line 166 so to specify the rate at which the difference between the KV Input (voltage) and DC current values provided along lines 172 and 174 respectively will be sampled for the purpose of detecting a departure of the current signal with respect to the voltage signal.

Figure 3:
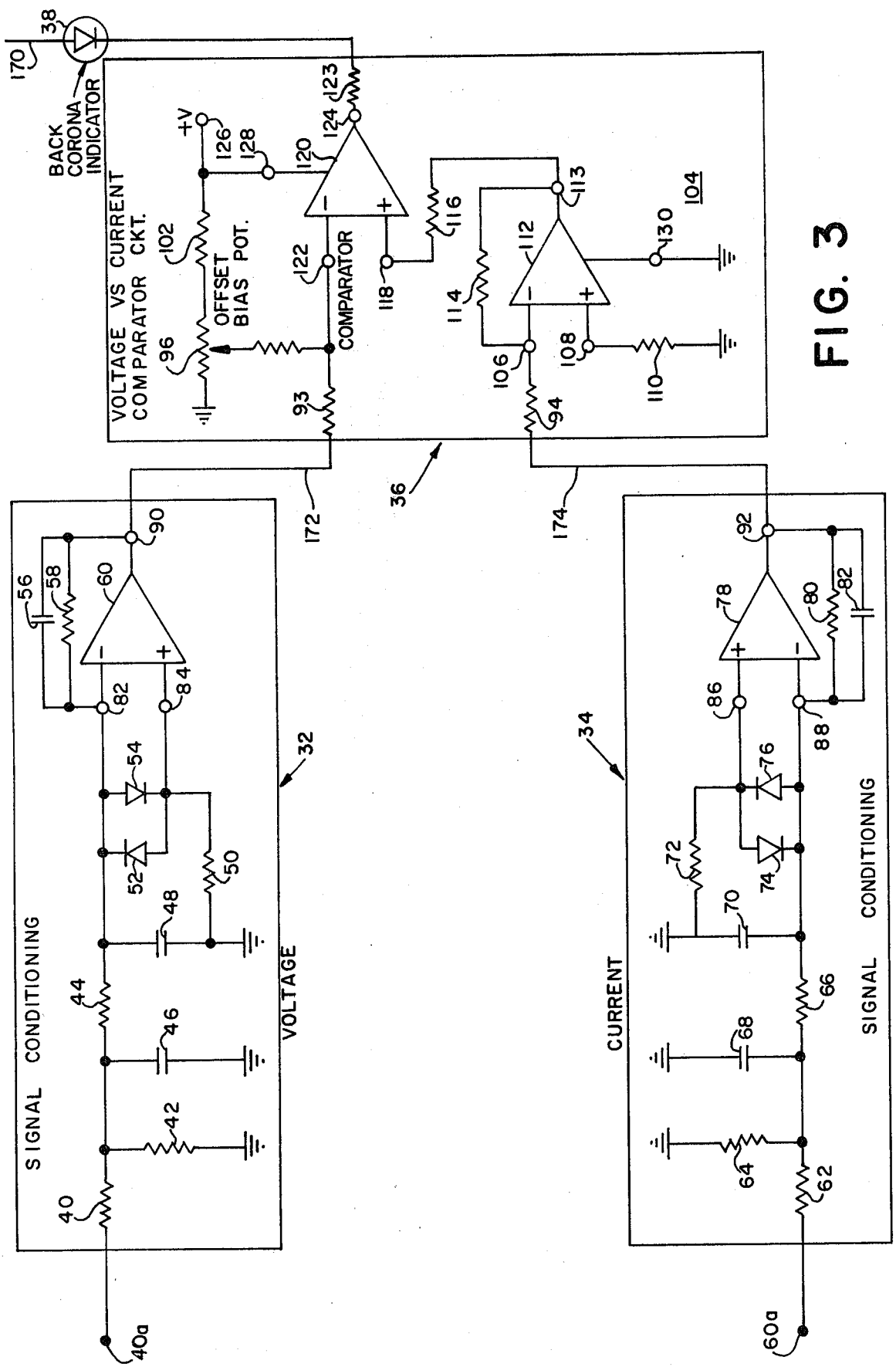
FIG. 3 is a circuit diagram of signal conditioning and comparator circuits in the system shown in FIG. 1.

Referring to FIG. 3, both signal conditioning circuits, 32 and 34, perform the same function of eliminating ripple and spark pulses and high frequency noise in the KV Input signal and the DC current signal respectively.

The KV Input signal passes through a second order low-pass filter in circuit 32 comprising input terminal 40a and resistors 40, 42 and 44 and capacitors 46 and 48. The low-pass filter substantially smoothes the ripple component of the KV Input signal. The voltage taken across capacitor 48 provides a current through resistor 50 and to the two diodes, 52 and 54, so that, in combination, they remove the spark pulses that, when it occurs, rides atop the ripple component of the KV Input signal. The partly conditioned signal is now provided as input to terminals 82 and 84 of frequency compensated inverting op-amp 60 having feedback resistor 58 in parallel with capacitor 56. The capacitor 56 removes the high frequency noise in the KV Input signal.

The DC current signal passes through a second order low-pass filter in circuit 34 comprising input terminal 62a, resistors 62, 64 and 66 and capacitors 68 and 70. The low-pass filter substantially smoothes the ripple component of the DC current signal. The voltage taken across capacitor 70 provides a current through resistor 72 and to diodes, 74 and 76, so that, in combination, they remove the spark pulse that, when it occurs, rides atop the ripple component of the DC current signal. The partly conditioned signal is now provided as input to terminals 86 and 88 of frequency compensated inverting op-amp 78 having feedback resistor 80 in parallel with capacitor 82. The capacitor 82 removes the high frequency noise in the DC current signal.

The conditioned KV Input signal at output terminal 90 and the conditioned DC current signal at output terminal 92 are both provided as input to voltage vs. current comparator 36 through input resistors 92 and 94 respectively.

The KV Inut signal becomes an offset voltage signal due to adjustment of the offset bias potentiometer 96. Current is applied to offset bias potentiometer 96 through the voltage divider formed by resistor 102 which is connected to a +12 power supply volt power source at terminal 126. This 12 volt power source is also supplied to terminal 128 in order to drive op-amp 120. The offset bias potentiometer 96 is used to adjust an offset between the conditioned KV Input signal and the conditioned DC current signal so to establish sensitivity between both signal levels.

The DC current signal is provided as input to an inverting op-amp circuit 104 via op-amp input terminal 106. The other op-amp input terminal 108 is grounded through resistor 110. The inverting op-amp circuit having op-amp 112 and feedback resistor 114 is used for inverting the DC current signal so as to provide the comparator op-amp 120 with two signals having the same polarity. Op-amp 112 is grounded through terminal 130. The output of the inverting op-amp circuit 104 at 113 is provided as one input to comparator op-amp 120 through input resistor 116. This input is provided to the non-inverting terminal 118 of comparator op-amp 120 of comparator circuit 136. The other input to inverting terminal 122 of comparator op-amp 120 is the conditioned KV Input offset voltage signal.

Comparator circuit 36, as shown in FIGS. 1 and 3, operates to detect or sense a voltage imbalance between the conditioned, compensated DC current signal and the conditioned, offset KV Input signal (voltage) at the moment a back corona condition occurs and precipitation substantially ends. As the current begins to increase faster than the voltage is ramping, the output of the comparator becomes sufficiently large at terminal 124 so that enough current flows through load resistor 123 to turn on indicator light 38. The comparator circuit 36 continuously compares the conditioned, offset KV Input signal (voltage) with the conditioned, compensated DC current signal for the purpose of determining when a back corona condition occurs. Both signals increase proportionally to one another under normal operating conditions.

A back corona condition occurs when particulate matter or dust forms on at least one plate of the electrostatic precipitator such that a back corona is formed between the plate and the dust layer. In general, the back corona will be formed when the particulate matter has a high resistivity of the order of $10^{-19}$ ohms per cubic centimeter. The current will be consumed by the back corona in order to sustain it and will not be used to accelerate particles between the plates thereby virtually stopping particulate precipitation. The back corona requires more and more current such that the current continues to increase at a faster rate than the ramping voltage.

The comparator circuit 36 provides an output signal at 124 that is the offset difference between the input voltage signal and the input voltage current signal. As the current begins to increase more rapidly than the ramping voltage signal, thereby indicating the existence of the back corona condition, the comparator output signal at 124 is of sufficient magnitude to turn on indicator light 38 and start a pulse generator that sends pulses periodically to current set back circuit 132. The current is continuously set back until the knee in the voltage/current function is reached, i.e. until a point is reached where current is no longer increasing for the purpose of maintaining the back corona. In actuality, the current level is being minimized while the voltage that is producing it is maximized. The precipitator is operated at the point at which current is no longer increasing i.e. at the knee of the voltage vs current curve.

It will be understood that the set point values to blocks 142, 36, 132 and 134 may be provided by analog means instead of processor 144.

What is claimed is:

1. A control system for monitoring across an electrostatic precipitator the departure of current from voltage at the start of a back corona condition and continuously reducing the current until said back corona condition is substantially minimized comprising means for comparing the voltage and current applied to the precipitator for detecting when said current increases at a faster rate than said voltage for producing a signal indicating a back corona condition, and means for setting back said current in response to said back corona condition signal for substantially minimizing said current while maximizing said voltage to maintain normal precipitator operation at the knee of the voltage/current curve.

2. The control system of claim 1 in which said setting back means includes set-point means for continuously varying in one direction a reference potential upon application of said back corona condition signal, and current limiting means for preventing said current from exceeding a value related to said reference potential.

3. The control system of claim 2 in which said set-point means comprises means for counting during the time duration of said back corona condition signal and for producing said reference potential varying in said one direction.

4. The control system of claim 3 in which said counting means includes an up/down counter and a digital to analog converter, said up/down counter having an output coupled to said digital to analog converter whereby said up/down counter counts during the time duration of said back corona condition signal.

5. The control system of claims 1, 2 or 3 in which said comparing means includes means for offsetting in magnitude said voltage with respect to said current to produce offset signals, and a comparator for comparing the offset signals for producing said back corona condition signal when the offset proportion changes.

6. The control system of claim 5 in which there is provided first and second signal conditioning circuits for said voltage and current respectively for reducing ripple effect and substantially eliminating sparking and means for applying the output of said first and second single conditioning circuits to said offset means.

* * * * *